Sept. 20, 1971     J. C. HAMMONDS ET AL     3,606,220
MEANS TO LUBRICATE SCREW OPERATED TRAILER HITCHES
Filed May 25, 1970     5 Sheets-Sheet 1
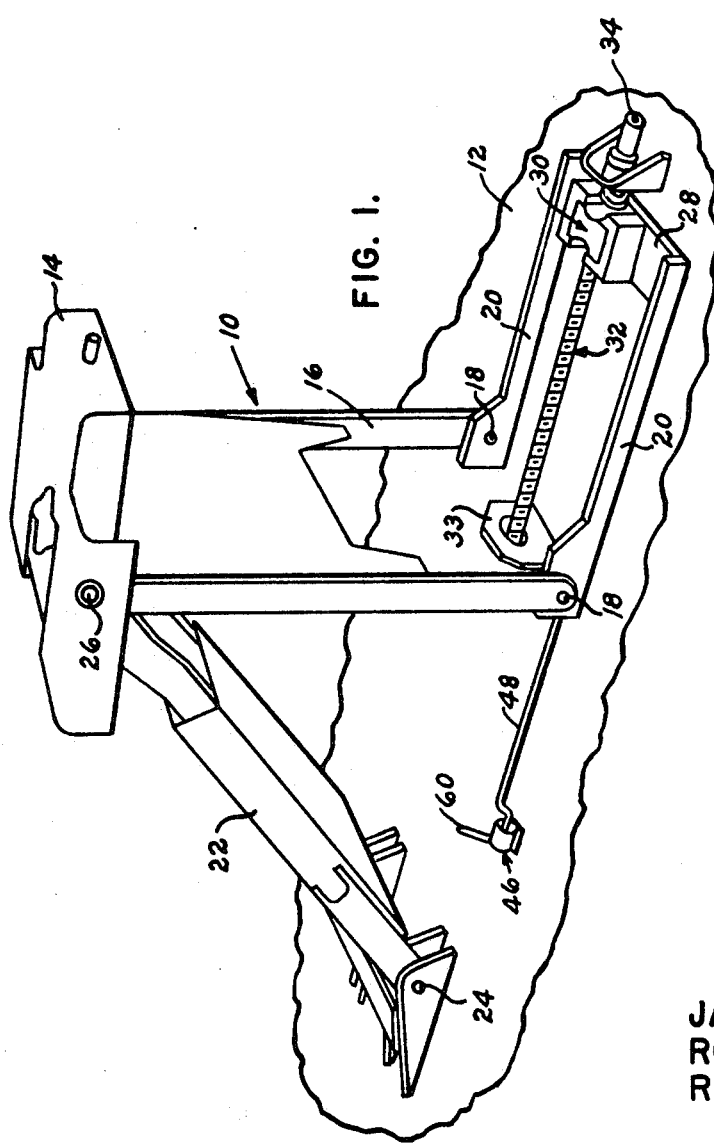
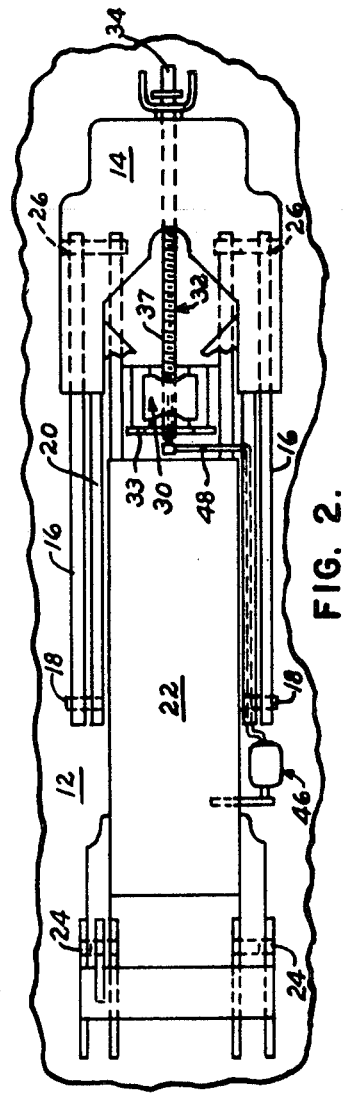
INVENTORS.
JAMES C. HAMMONDS
ROBERT W. RANDOLPH
RICHARD P. YEATES
BY Eugene N. Riddle
ATTORNEY

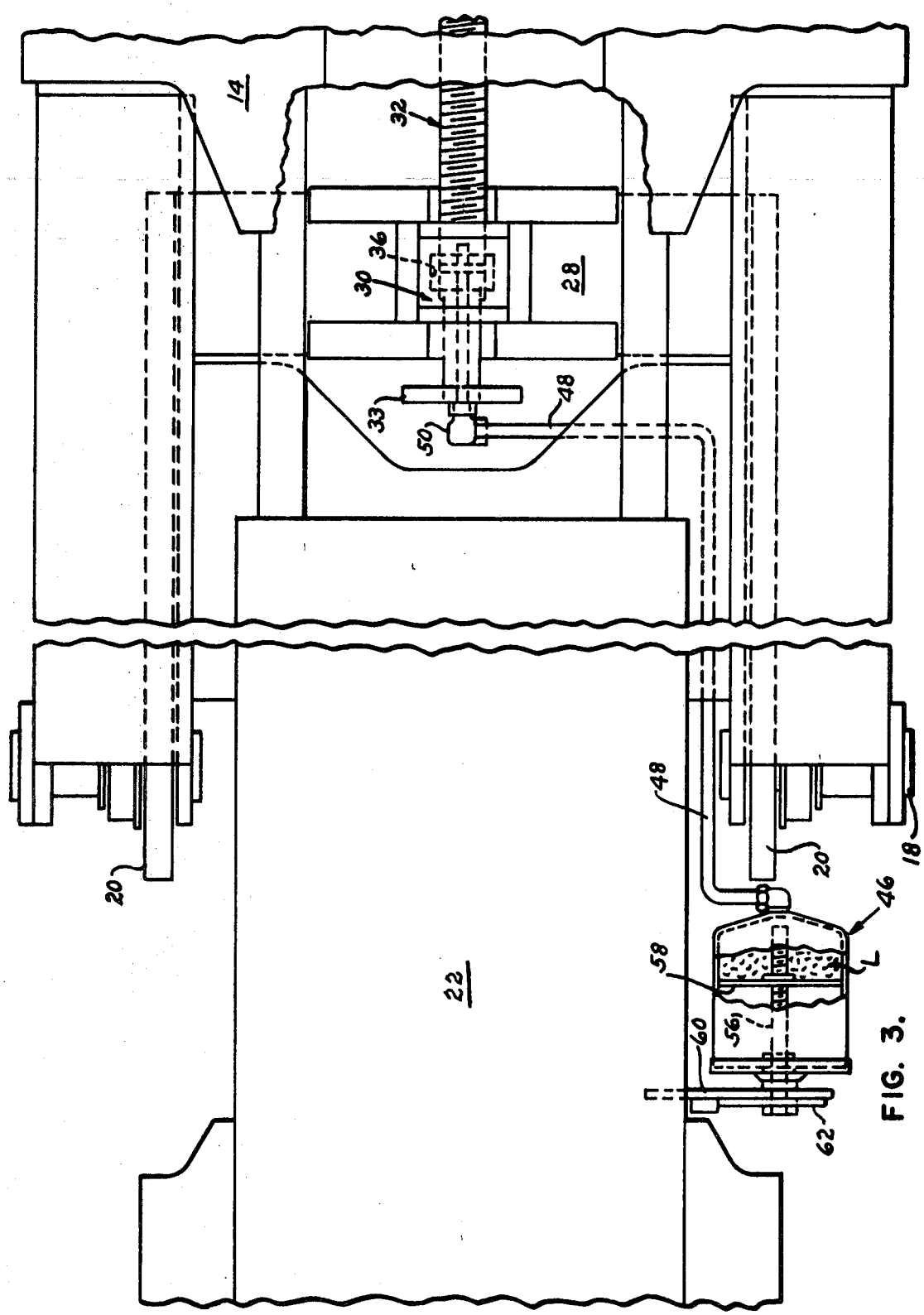

Sept. 20, 1971  J. C. HAMMONDS ET AL  3,606,220
MEANS TO LUBRICATE SCREW OPERATED TRAILER HITCHES Filed May 25, 1970  5 Sheets-Sheet 3

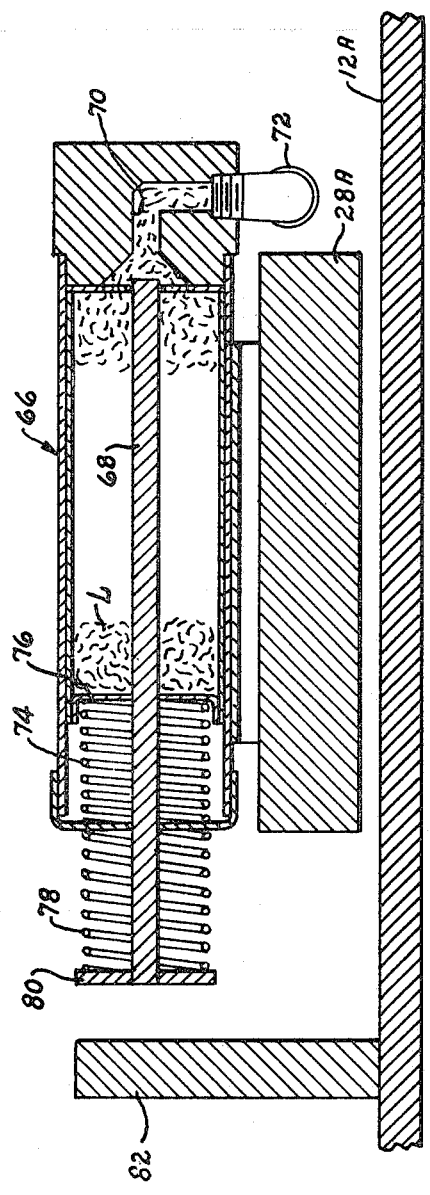
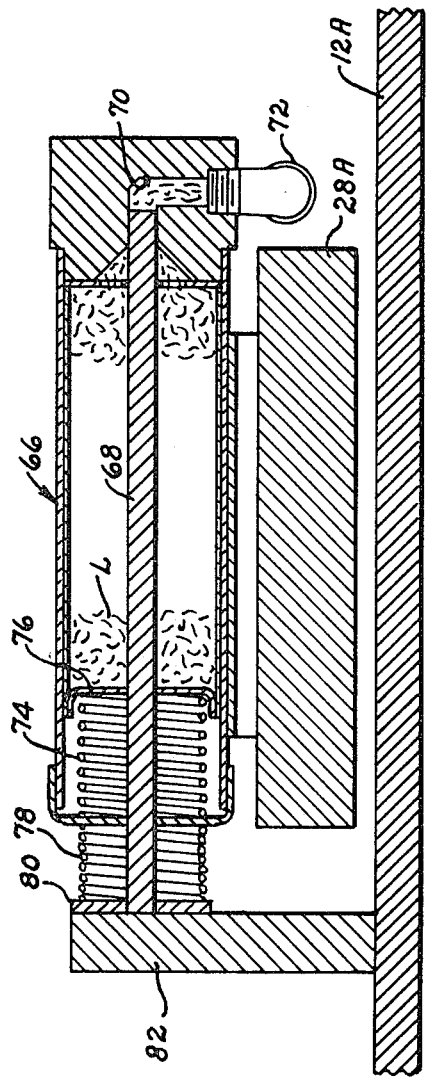
FIG. 9.
FIG. 8.

United States Patent Office 3,606,220
Patented Sept. 20, 1971

3,606,220
MEANS TO LUBRICATE SCREW OPERATED TRAILER HITCHES
James C. Hammonds and Robert W. Randolph, St. Charles, and Richard P. Yeates, Bridgeton, Mo., assignors to ACF Industries, Incorporated, New York, N.Y.
Filed May 25, 1970, Ser. No. 40,997
Int. Cl. B60p *7/06;* B61d *3/16*
U.S. Cl. 248—119S                                     6 Claims

ABSTRACT OF THE DISCLOSURE

A nut mounted on an externally threaded screw for raising and collapsing a trailer hitch on a railway car upon rotation of the screw is supplied with lubricant for lubricating the screw upon each cycle of raising and collapsing the hitch. A supply of lubricant is in fluid communication with a lubricant well within the nut and actuating means is operatively connected to the lubricant supply to force upon actuation a predetermined amount of lubricant from the lubricant supply to the nut. The actuating means is responsive to the movement of the trailer hitch between collapsed and raised positions and is actuated upon each cycle of raising and collapsing the hitch thereby to provide lubricant to the nut and screw upon each cycle of hitch operation.

BACKGROUND OF THE INVENTION

Screw operated trailer hitches which are mounted on railway flat cars in so-called "piggyback" service secure the kinpin of trailers which are transported on the flat car. The hitches are collapsible and may be moved to a generally collapsed or flat position on the deck so that tractors and trailers may be driven thereover. A slide member moves horizontally along the deck upon rotation of an externally threaded screw for raising and lowering the hitch and a nut is threaded on the screw for effecting movement of the slide upon rotation of the screw by a suitable power wrench or the like. The nut has to be replaced frequently due to wear and friction between the screw and nut upon rotation of the screw. To decrease the friction and/or wear between the screw and nut, the screw should be lubricated at frequent intervals by workmen. However, this has been found to be a costly maintenance item and at times, not too dependable in actual practice. Another method has involved the placing of a flexible boot or cover about the screw to aid in retaining lubricant thereon and to minimize foreign matter on the screw. However, all of the prior methods employed for maintaining the screw in a lubricated position under all conditions of service have been found to be undependable.

BRIEF DESCRIPTION OF THE INVENTION

The present invention is directed to means for applying a predetermined amount of lubricant to the nut and associated screw of the hitch upon each cycle of raising and lowering the hitch. The nut has an internal screw threaded portion adjacent each end thereof and an enlarged lubricant well between the threaded end portions. A lubricant supply in fluid communication with the well is actuated by the movement of the hitch and a predetermined amount of lubricant is forced into the well of the nut for application to the screw. An actuating means responsive to the movement of the trailer hitch between collapsed and raised positions is connected to the lubricant supply to force upon actuation a predetermined amount of lubricant from the lubricant supply to the nut. The actuating means is contacted by the hitch when the hitch moves to its collapsed position on the deck thereby to provide lubricant to the nut and screw upon each cycle of hitch operation.

In the accompanying drawings, in which two possible embodiments of the invention are illustrated, FIG. 1 is a perspective of a trailer hitch shown in erect position on a railway piggyback car with lubricating means comprising the present invention employed for lubricating the elevating screw nut for raising and lowering the hitch;

FIG. 2 is an enlarged top plan of the trailer hitch of FIG. 1 shown in a collapsed position with the lubricating means positioned thereon;

FIG. 3 is an enlarged fragment of FIG. 2 showing the lubricating means thereon, certain parts being broken away;

FIG. 8 is a longitudinal section of the lubricant supply for the modified form of the invention illustrated in FIG. 7 with the actuating means being engaged and forcing lubricant from the lubricant supply; and FIG. 9 is a section view similar to FIG. 8 but showing the actuating means in a released position.

Figure 5:
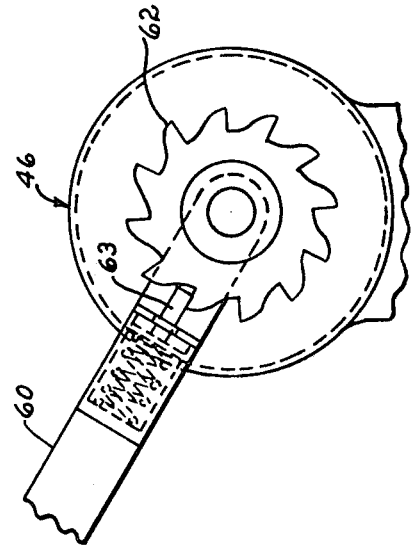
FIG. 5 is an end elevation, partly schematic, showing the drive means for forcing a predetermined amount of lubricant from the lubricant supply shown in FIG. 4.

Referring now to the drawing for a better understanding of this invention, a trailer hitch generally indicated 10 is illustrated in FIGS. 1 and 2 and is mounted on a deck 12 of a railway flat car. Hitch 10 is shown in an erect position in FIG. 1 and in a collapsed position in FIG. 2. Trailer hitch 10 includes an upper mounting plate 14 which is adapted to engage the kingpin of a trailer for securing the trailer for transit on the railway flat car.

A vertical leg 16 is pivoted at 18 to a slide or yoke 20 mounted for sliding movement along deck 12, and a diagonal leg 22 is pivoted about a fixed axis 24 to deck 12. Legs 16 and 22 are pivoted at 26 to mounting plate 14. Upon sliding movement of slide 20 along deck 12, a lower end of leg 16 moves therewith to move hitch 10 between collapsed and erect positions. A slide 20 includes a cross support 28 having a slide block or nut 30 mounted thereon. An elevating screw 32 engages nut 30 and upon rotation moves nut 30 and slide 20 back and forth to move leg 16 and hitch 10 between collapsed and erect positions. A bracket 33 supports the inner end of screw 32 for relative rotation. A bracket supports the outer end of screw 32 and socket 34 on the end of screw 32 may be engaged by a suitable power wrench in order to rotate screw 32. For further details of hitch 10, reference is made to Pat. 3,145,006 dated Aug. 18, 1964, and entitled "Collapsible Trailer Support and Anchor," the entire disclosure of which is incorporated by this reference.

Nut 30 includes threaded end portions 35 and a lubricant well 36 between threaded end portions 35. Foreign matter tends to collect on the external screw threads 37 of screw 32 and if the foreign matter enters nut 30, an abrasive action results between internal screw threads 38 of nut 30 and external screw threads 37 of screw 32 upon movement of nut 30 along screw 32. To minimize the entry of foreign matter within nut 30, a wiper element 39 within a bore 40 adjacent each end of nut 30 projects within the groove formed by screw thread 37 of screw 32. A spring 41 urges wiper element 39 into engagement with screw thread 37 and a cover 42 is resealably secured by suitable screws to retain spring 41 in position. Wiper elements 39 minimize leakage of lubricant from nut 30 in addition to wiping screw 32 of adhering foreign matter. For further details of nut 30, reference is made to copending application Ser. No. 764,820, filed Oct. 3, 1968, the entire disclosure of which is incorporated by this reference.

Figure 6:
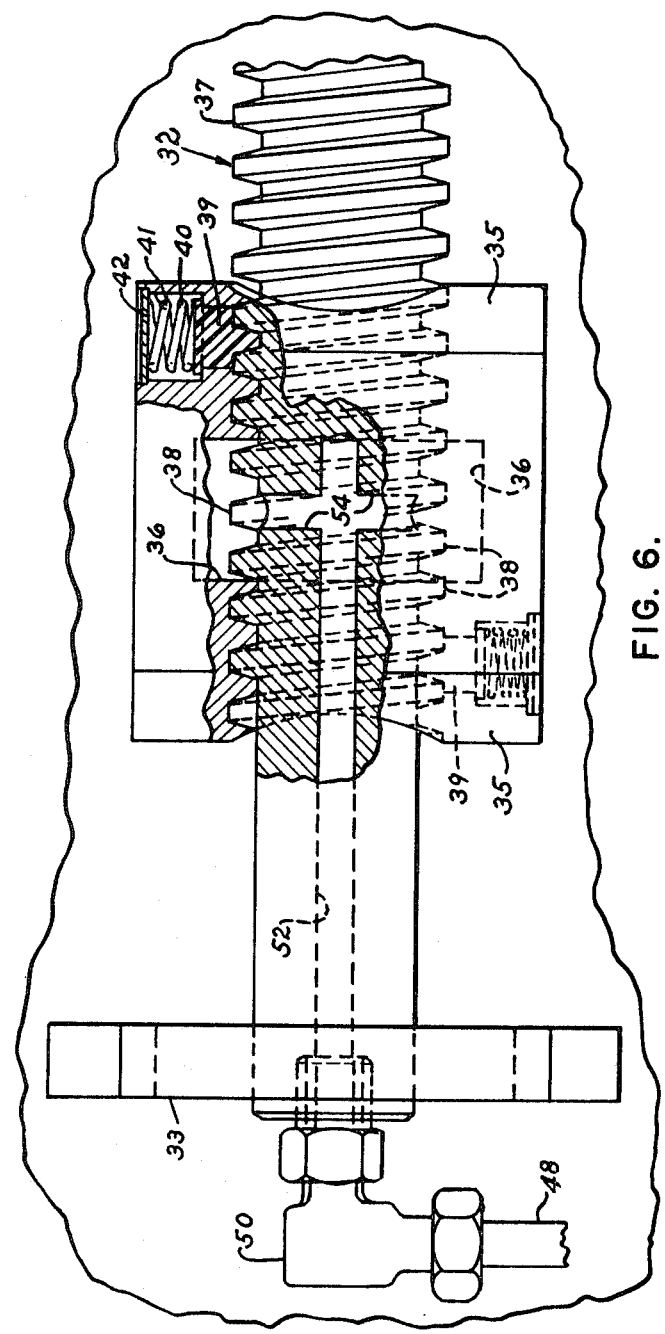
FIG. 6 is an enlarged plan of the inner end of the elevating screw and adjacent nut with the lubricant line leading to the screw and connected thereto about a swivel-type coupling to permit relative rotation of the screw.

A supply of lubricant L is provided within housing 46 and a lubricant line 48 extends therefrom to an end of screw 32. As shown in FIG. 6, a coupling 50 is provided at the end of screw 32 and an axial bore 52 extends from a swivel-type coupling 50 to nut 30. Ports 54 connect bore 52 with lubricant well 36 and nut 30. Coupling 50 permits rotation of screw 32 relative to lubricant line 48 upon raising and lowering of hitch 10. A threaded screw 56 extends within housing 46 and a pusher plate 58 is threaded on screw 56 for longitudinal movement therealong. An actuating arm 60 is mounted adjacent an end of screw 56 and a spring 61 urges actuating arm 60 upwardly. A ratchet 62 is secured to the end of screw 56 and a holding pawl 63 is carried by arm 60 and provides a driving connection to ratchet 62 for rotation of screw 56 and corresponding movement of plate 58 upon a downward movement of actuating arm 60.

Figure 4:
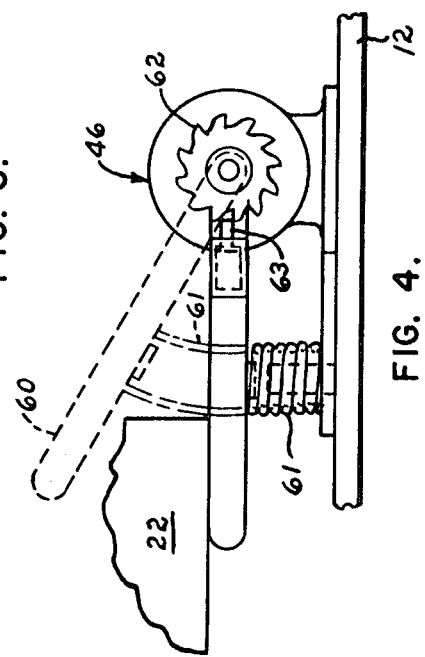
FIG. 4 is an enlarged end elevation of the lubricant supply and the actuating means therefor.

As shown in FIG. 4, upon collapsing of hitch 10, diagonal 22 engages actuating arm 60 to depress arm 60 downwardly effecting rotation of screw 56 and the inward movement of pusher plate 58 to force an amount of lubricant L from housing 46 to nut 30. Upon the raising of diagonal leg 22, actuating arm 60 returns to its upper position under the bias of spring 61.

Figure 7:
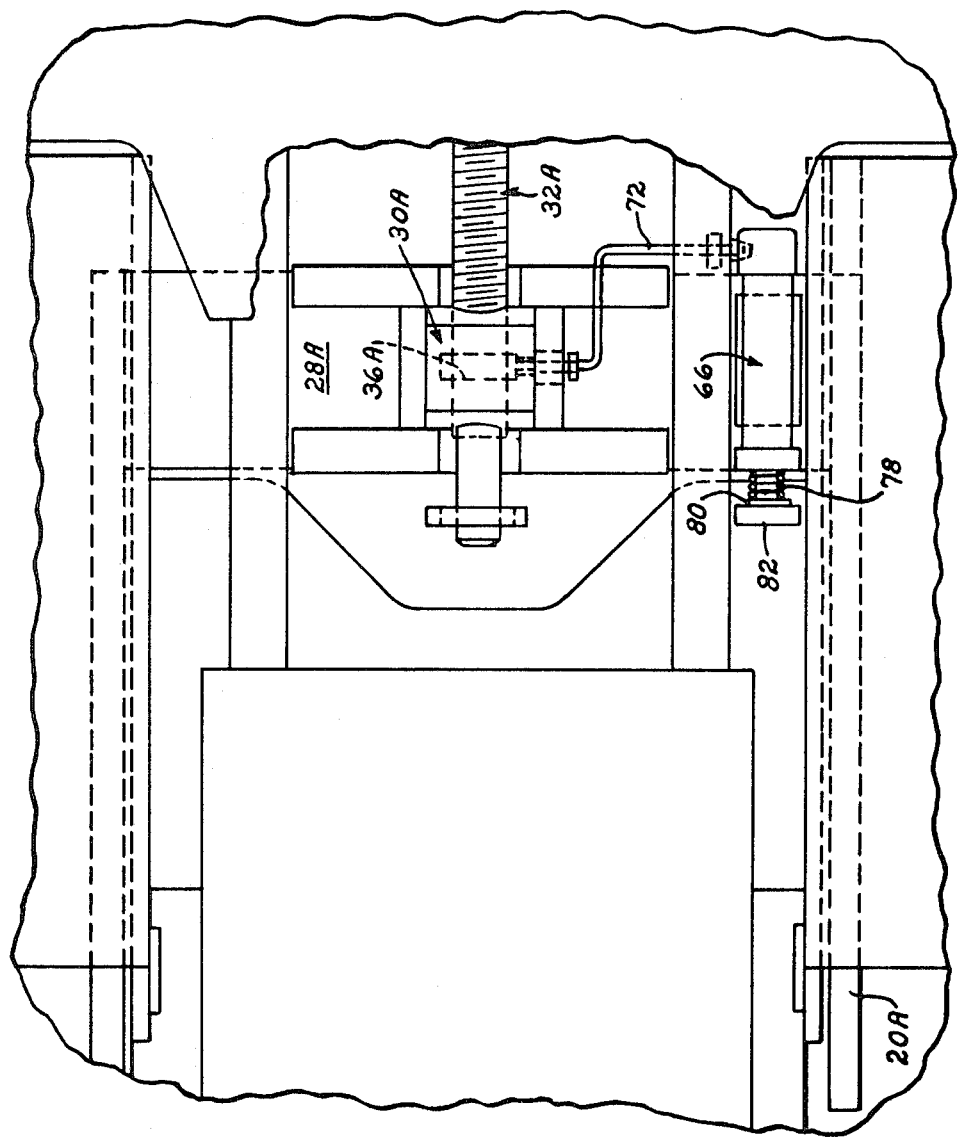
FIG. 7 is an enlarged top plan of a modified form of the invention in which a lubricant supply is mounted adjacent the nut and has a supply line connected directly to the nut.

Referring to FIGS. 7–9, another embodiment of lubricating means is illustrated with the lubricant supply being carried by and moving with slide 20A. A cross support 28A on slide 20A has a nut 30A mounted thereon with a lubricant well 36A therein. Nut 30A is threaded on screw 32A. A lubricant housing 66 contains lubricant L therein and a plunger 68 has an inner end adapted to move within bore 70 to charge lubricant line 72 with lubricant. Spring 74 mounted in housing 66 urges pusher plate 76 against lubricant L to maintain the lubricant under pressure. A spring 78 mounted between the outer end of housing 66 and an end cap 80 secured to the outer end of plunger 68 urges plunger 68 outwardly as shown in FIG. 9.

A stop 82 is secured to deck 12A and is adapted to engage end plate 80 upon collapsing of the hitch on deck 12A as shown in FIG. 8, thereby to push plunger 68 inwardly to force a portion of lubricant L within line 72 to lubricant well 36A in nut 30A. Upon collapsing of the hitch, slide 20A moves rearwardly carrying cross support 28A and lubricant housing 66 therewith. Upon reaching the collapsed position of the hitch, end cap 80 engages stop 82 as shown in FIGS. 7 and 8 to force a portion of lubricant within nut 30A thereby to provide lubricant to nut 30A upon each operating cycle of the hitch.

What is claimed is:

1. In a collapsible trailer hitch movable between collapsed and raised positions and having, an upstanding leg, a slide member connected adjacent the lower end of said leg for moving the leg back and forth, an externally threaded screw operatively connected to said slide member, and a nut threaded on said screw and connected between the screw and slide member for moving said slide member in a generally horizontal direction upon rotation of said screw, said nut having an internal screw threaded portion adjacent each end thereof and an enlarged lubricant well between the threaded end portions; the improvement comprising, a supply of lubricant in fluid communication with the nut and lubricant well and mounted in a position remote from the nut, and actuating means operatively connected to the lubricant supply to force a predetermined amount of lubricant from the lubricant supply to the nut, said actuating means being responsive to the movement of the trailer hitch between collapsed and raised positions and being actuated upon each cycle of raising and collapsing the hitch thereby to provide lubricant to said nut at least upon each cycle of hitch operation.

2. In a collapsible trailer hitch movable between collapsed and erect positions and having, an upstanding leg, a slide member connected adjacent the lower end of said leg for moving the leg back and forth, an externally threaded screw operatively connected to said slide member, and a nut threaded on said screw and connected between the screw and slide member for moving said slide member in a generally horizontal direction upon rotation of said screw, said nut having an internal screw threaded portion adjacent each end thereof and an enlarged lubricant well between the threaded end portions; the improvement comprising, a container having a supply of lubricant therein and mounted in a position remote from the nut, means providing fluid communication between the container and the nut to permit a flow of lubricant from the container to the lubricant well in the nut, and actuating means operatively connected to the container to force when actuated a predetermined amount of lubricant from the container to the nut, said actuating means being responsive to the collapsing of the hitch and being actuated upon the movement of the hitch to the collapsed position thereby to provide lubricant to said nut upon each cycle of hitch operation.

3. In a collapsible trailer hitch as defined in claim 2, said means providing fluid communication between the container and the nut including, an axial bore in said screw communicating with the lubricant well, a lubricant conduit between the container and the axial bore, and a swivel connection between the lubricant conduit and the axial bore to permit relative rotation of the screw.

4. In a collapsible trailer hitch as defined in claim 2, said actuating means operatively connected to the container comprising a plunger adapted to contact a movable portion of the hitch when the hitch is moved to a collapsed position.

5. For use with a nut threaded on an elevating screw for raising and collapsing a collapsible trailer hitch and having a lubricant well; a container having a supply of lubricant therein and mounted in a position remote from the nut, means providing fluid communication between the container and the nut to permit a flow of lubricant from the container to the lubricant well in the nut, and actuating means operatively connected to the container to force when actuated a predetermined amount of lubricant from the container to the nut, said actuating means being responsive to the collapsing of the hitch and being actuated upon the movement of the hitch to the collapsed position thereby to provide lubricant to said nut upon each cycle of hitch operation.

6. For use with a nut threaded on an externally threaded screw for raising and collapsing a collapsible trailer hitch and having a lubricant well; a supply of lubricant in communication with the nut and lubricant well and mounted in a position remote from the nut, and actuating means operatively connected to the lubricant supply to force when actuated a predetermined amount of lubricant from the lubricant supply to the nut, said actuating means being responsive to the movement of the trailer hitch between collapsed and raised positions and being actuated upon each cycle of raising and collapsing the hitch thereby to provide lubricant to said nut at least upon each cycle of hitch operation.

References Cited

UNITED STATES PATENTS

| | | | |
|---|---|---|---|
| 1,224,919 | 5/1917 | Gage | 184—37 |
| 2,437,208 | 3/1948 | Pope | 184—37X |
| 3,011,590 | 12/1961 | Ovellette | 184—37X |
| 3,461,990 | 8/1969 | Stripp et al. | 184—37X |
| 3,499,624 | 3/1970 | Custer | 105—368S |

J. FRANKLIN FOSS, Primary Examiner

U.S. Cl. X.R.

105—368S; 184—14, 27R